United States Patent
Xu et al.

(10) Patent No.: US 12,139,611 B2
(45) Date of Patent: Nov. 12, 2024

(54) HIGH MOLECULAR POLYMER POWDER MATERIAL AND PREPARATION METHOD THEREOF

(71) Applicant: FARSOON TECHNOLOGIES CO., LTD., Changsha (CN)

(72) Inventors: Xiaoshu Xu, Changsha (CN); Jiebin Wen, Changsha (CN); Guang Bao, Changsha (CN); Siqi Zeng, Changsha (CN); Wenya Xu, Changsha (CN); Jian Li, Changsha (CN); Shuai Hou, Changsha (CN); Yiling Zeng, Changsha (CN); Zhiyong Yin, Changsha (CN)

(73) Assignee: FARSOON TECHNOLOGIES CO., LTD., Changsha (CN)

( * ) Notice: Subject to any disclaimer, the term of this patent is extended or adjusted under 35 U.S.C. 154(b) by 448 days.

(21) Appl. No.: 17/292,244

(22) PCT Filed: Oct. 18, 2019

(86) PCT No.: PCT/CN2019/111972
§ 371 (c)(1),
(2) Date: May 7, 2021

(87) PCT Pub. No.: WO2020/093855
PCT Pub. Date: May 14, 2020

(65) Prior Publication Data
US 2021/0403714 A1    Dec. 30, 2021

(30) Foreign Application Priority Data

Nov. 9, 2018  (CN) .......................... 201811331785.5
Nov. 9, 2018  (CN) .......................... 201811331794.4
Nov. 9, 2018  (CN) .......................... 201811332850.6

(51) Int. Cl.
*C08L 79/08*   (2006.01)
*B82Y 30/00*   (2011.01)
(Continued)

(52) U.S. Cl.
CPC .............. *C08L 79/08* (2013.01); *C08K 3/042* (2017.05); *C08K 3/22* (2013.01); *C08L 77/02* (2013.01);
(Continued)

(58) Field of Classification Search
CPC ......... B29C 64/153; B33Y 10/00; C08K 3/04; C08K 3/042; C08K 3/045;
(Continued)

(56) References Cited

U.S. PATENT DOCUMENTS

2018/0201783 A1    7/2018    DeFelice et al.

FOREIGN PATENT DOCUMENTS

CN    101319075 A    12/2008
CN    103951971 A    7/2014
(Continued)

OTHER PUBLICATIONS

CN 107722617 A machine translation (Feb. 2018).*
(Continued)

*Primary Examiner* — Ana L. Woodward
(74) *Attorney, Agent, or Firm* — Kagan Binder, PLLC (57) ABSTRACT

The present invention provides a method for preparing a high molecular polymer powder material comprising the following steps: adding 20 parts of a high molecular powder material and 0.1 to 10 parts of carbon black into a mixing tank, and performing high-speed stirring for the first time to obtain a high molecular carbon black mixed powder material; adding the high molecular carbon black mixed powder material, 0.1 to 1 part of a flow aid, and 80 parts of a polymer powder material into the powder mixing tank; and perform-
(Continued)

ing high-speed stirring for a second time followed by sieving to obtain the high molecular polymer powder material.

4 Claims, 3 Drawing Sheets

(51) Int. Cl.
| | |
|---|---|
| *B82Y 40/00* | (2011.01) |
| *C08K 3/04* | (2006.01) |
| *C08K 3/22* | (2006.01) |
| *C08L 77/02* | (2006.01) |
| *C08L 77/06* | (2006.01) |

(52) U.S. Cl.
CPC ............... *C08L 77/06* (2013.01); *B82Y 30/00* (2013.01); *B82Y 40/00* (2013.01); *C08K 2003/2272* (2013.01)

(58) Field of Classification Search
CPC .... C08K 2003/2227; C08K 2003/2241; C08K 2/36; C08L 77/02; C08L 77/06; C08L 23/0853; C08L 81/04; C08L 81/06; C08L 87/00
See application file for complete search history.

(56) References Cited

FOREIGN PATENT DOCUMENTS

| CN | 104710786 | A | | 6/2015 |
|---|---|---|---|---|
| CN | 106928592 | A | | 7/2017 |
| CN | 107722617 | A | * | 2/2018 |
| CN | 107936547 | A | | 4/2018 |
| CN | 108384227 | A | | 8/2018 |
| CN | 109517377 | A | | 3/2019 |
| CN | 109535709 | A | | 3/2019 |
| CN | 109575323 | A | | 4/2019 |
| WO | WO 2005/085326 | A1 | * | 9/2005 |
| WO | 2018140443 | A1 | | 8/2018 |
| WO | 2018141631 | A1 | | 8/2018 |

OTHER PUBLICATIONS

WO 2005/085326 A1 machine translation (Sep. 2005).*
Extended European Search Report for European Counterpart Application No. 19881933.6, mailed Jul. 12, 2022 (7 pages).
Athreya et al., "Processing and characterization of a carbon black-filled electrically conductive Nylon-12 nanocomposite produced by selective laser sintering," Materials Science and Engineering A, vol. 527, No. 10-11, pp. 2637-2642 (2010) (6 pages).
International Search Report, and English Translation thereof, for International Application No. PCT/CN2019/111972, mailed Jan. 3, 2020 (6 pages).
Wagner et al., "Laser Sintering of High Temperature Resistant Polymers with Carbon Black Additives," International Polymer Processing Journal of the Polymer Processing Society, 19(4), pp. 395-401, 2019, (7 pages).

* cited by examiner

HIGH MOLECULAR POLYMER POWDER MATERIAL AND PREPARATION METHOD THEREOF

CROSS REFERENCE TO RELATED APPLICATIONS

This application claims priority to Chinese Patent Applications No. 201811331785.5, filed to Chinese Patent Office, on Nov. 9, 2018, entitled "macromolecule polymer powder material and preparing method thereof", No. 201811331794.4, filed to Chinese patent office, on Nov. 9, 2018, entitled "macromolecule polymer powder material and preparing method thereof", and No. 201811332850.6, filed to Chinese patent office, on Nov. 9, 2018, entitled "nylon polymer powder material and preparing method thereof", the contents of which are incorporated herein in entirety by reference.

TECHNICAL FIELD

The present disclosure relates to the field of additive manufacturing technology, and in particular, to a macromolecule polymer powder material and a preparing method thereof.

BACKGROUND

Selectively sintering and fusing a plurality of powder layers with laser is a method of manufacturing three-dimensional objects. This method allows to obtain a three-dimensional entity without using tooling but only by laser sintering the plurality of overlapping powder layers based on a three-dimensional image of an object to be manufactured. This method is completed mainly by using thermoplastic polymers. Patents U.S. Pat. No. 6,136,948 and WO9606881 describe such a method of using powder-like polymers to manufacture three-dimensional objects in detail.

The current mainstream selective laser sintering is performed mainly by using a $CO_2$ laser, which corresponds to a mid-infrared region waveband, and polyamide powder materials have a higher laser absorption rate at wavelengths within this range. The polyamide powder materials have the most significant laser absorption effect at a wavelength of 10600 nm, and the $CO_2$ laser with this wavelength is most widely used.

Manufacturing accuracy of three-dimensional parts is related to a size of a laser spot. The smaller the spot, the higher the manufacturing accuracy. The size of the laser spot is proportional to its wavelength and laser modulus. When polyamide three-dimensional parts are manufactured, it is often difficult to achieve desired effects with $CO_2$ laser sintering for finer characteristic structures.

In the patent CN106626379A, a solution of using a fiber laser to sinter polyamide is mentioned. The polyamide powder material has a relatively low fiber laser absorption rate, which cannot meet requirements of fusion manufacturing, and thus it is necessary to use a thermal medium method to increase the laser absorption rate of the polyamide powder. By adding a heat absorption medium, the thermal medium in the polyamide can effectively absorb energy of the laser and transfer it to the polyamide powder that needs to be fused. The fiber laser can use a smaller laser spot to manufacture the polyamide three-dimensional objects, thereby improving the manufacturing accuracy. However, if a problem of uniform mixing of the thermal medium and the macromolecule polymer cannot be solved, surface quality of a sintered workpiece will be poor and the fine structure cannot be printed. In addition, due to the nonuniform mixing of the thermal medium, the stability of the sintering effect will be poor. Therefore, there is an urgent need to develop a macromolecule polymer powder material that can mix the thermal medium and macromolecule powder material uniformly.

SUMMARY

The present disclosure provides a method of preparing a macromolecule polymer powder material applicable for being sintered through a fiber laser. Through a stirring process of the present disclosure, carbon black is distributed on a surface of the macromolecule powder material more uniformly, so that the macromolecule powder material can absorb visible light emitted by the fiber laser. Therefore, the fiber laser with a lower power can be used to perform sintering to prepare a macromolecule polymer workpiece. Unlike the existing method of directly fusing the macromolecule polymer powder by directly irradiating the macromolecule polymer powder with $CO_2$ laser such that laser energy is absorbed, in the method of the present disclosure, when the macromolecule polymer powder in an irradiation area is irradiated by the laser within this waveband, the carbon black on the surface of the macromolecule polymer powder absorbs a part of the laser energy, to get to a higher temperature, and then the energy is transferred to the macromolecule polymer powder through the thermal conduction, thereby realizing the fusion of the macromolecule polymer powder.

This not only enables the polyamide powder material to absorb the energy of the fiber laser at the visible light wavelength, but also enables other macromolecule polymer powder, such as thermoplastic polyurethane powder material, polypropylene powder material, polyethylene powder material, ethylene-vinyl acetate copolymer powder material, polyethersulfone powder material, polyphenylene sulfide powder material or polyether ether ketone powder material, to absorb the energy of the fiber laser at the visible light wavelength.

Therefore, the present disclosure provides a method of preparing a macromolecule polymer powder material, which includes: adding 20 parts of macromolecule powder material and 0.1~10 parts of carbon black into a stirring tank for a first high-speed stirring, to obtain a macromolecule carbon black mixed powder material; and adding the macromolecule carbon black mixed powder material, 0.1~1 part of flow aid, and 80 parts of the macromolecule powder material into a powder mixing tank for a second high-speed stirring, and then sieving, to obtain the macromolecule polymer powder material.

As a further preferred solution of the present disclosure, the method of preparing the macromolecule polymer powder material includes:

adding 20 parts of the macromolecule powder material and 0.1~5 parts of the carbon black into the stirring tank for the first high-speed stirring, to obtain the macromolecule carbon black mixed powder material; and adding the macromolecule carbon black mixed powder material, 0.1~1 part of the flow aid, 10~40 parts of a first thermal medium material, and 80 parts of the macromolecule powder material into the powder mixing tank for the second high-speed stirring, and then sieving, to obtain the macromolecule polymer powder material.

As a further preferred solution of the present disclosure, the macromolecule powder material is polyamide powder material. The method includes:

adding 85% to 99.9% of polyamide granules and 0.1% to 15% of a second thermal medium material by mass percentage into a polymerization kettle, and then adding a solvent, and preparing powder by using a solvent precipitation method, to obtain a polyamide powder material with the second thermal medium material as a nucleating agent;

adding 20 parts of the polyamide powder material and 0.1~1.5 parts of the carbon black into the stirring tank for the first high-speed stirring to obtain a polyamide carbon black mixed powder material; and adding the polyamide carbon black mixed powder material, 0.1~1 part of the flow aid, and 80 parts of the polyamide powder material into the powder mixing tank for the second high-speed stirring, and then sieving, to obtain a polyamide polymer powder material as the macromolecule polymer powder material.

As a further preferred solution of the present disclosure, the solvent precipitation method includes four stages of a first stage, a second stage, a third stage, and a fourth stage.

The first stage includes a heating and pressurizing stage, including controlling a stirring rate to 200~300 r/min, heating to a temperature of 200° C., and pressurizing to a pressure of 1.8 Mpa. At the heating and pressurizing stage, the polyamide granules are fully dissolved, the thermal medium can be uniformly dispersed, and the polyamide powder material with the heat medium as a nucleating agent is uniformly precipitated.

The second stage includes a cooling and depressurizing stage, including controlling the stirring rate to 500~600 r/min, cooling to a temperature of 100° C. to 130° C., and depressurizing to a pressure of 1.0 Mpa to 1.3 Mpa. At the cooling and depressurizing stage, under the condition of the higher stirring rate than that at the first stage, the particle size of the heterogeneous nucleated powder is more uniform, and the distribution of the nucleated powder material is more uniform.

The third stage includes maintaining the temperature and the pressure for 10~100 min, controlling the stirring rate to 50~100 r/min, maintaining the temperature at 100~130° C., and maintaining the pressure at 1.0~1.3 Mpa. At the stage of maintaining the temperature and the pressure, the crystal nucleus grows up in a very uniform environment, and thus the particle size distribution of the precipitated powder material is narrower, and the morphology of the powder material is more uniform.

At the fourth stage includes quickly cooling and depressurizing to a normal temperature and pressure, and the stirring rate is 600~800 r/min. The stirring rate continues to increase, so that the grown polyamide powder material will not agglomerate or bond to each other.

As a further preferred solution of the present disclosure, the solvent has a mass 6~12 times of the mass of the polyamide granules. The solvent is an alcohol solvent, an amide solvent, or a ketone solvent. Using the components of the solvent and proportion according to the present disclosure, the polyamide granules can be fully dissolved, and the polyamide and carbon black are distributed more uniformly.

As a further preferred solution of the present disclosure, the second thermal medium material is carbon black, graphite, graphene, carbon fiber, ferric oxide powder, ferroferric oxide powder, or metal powder, which greatly broadens the application scope of the thermal medium.

As a further preferred solution of the present disclosure, the metal powder is one or more selected from the group consisting of iron powder, aluminum powder, copper powder, tungsten powder, nickel powder, cobalt powder, titanium powder.

As a further preferred solution of the present disclosure, the second thermal medium material has an average particle size of 0.1~25 µm.

As a further preferred solution of the present disclosure, the carbon black, graphite, graphene in the thermal medium material has an average particle size of 0.1~1 µm.

As a further preferred solution of the present disclosure, specific process parameters of the first high-speed stirring are as follows: a temperature of the stirring tank is maintained at 30~40° C., a stirring rate of the stirring tank is 1500~2000 r/min, and stirring time of the stirring tank is 0.5~5 min. The smaller the particle size of carbon black is, the more difficult the carbon black is to be dispersed when the carbon black is directly and separately dispersed, and the agglomeration will occur. The carbon black and the macromolecule powder material are mixed via the first high-speed stirring, so that the carbon black and the macromolecule powder material can be mixed and distributed more uniformly.

As a further preferred solution of the present disclosure, the second high-speed stirring process is divided into two stages of a first stage and a second stage.

At the first stage, a temperature of the powder mixing tank is maintained at 70~80° C., a stirring rate of the powder mixing tank is 1200~1500 revolutions/min, and stirring time of the powder mixing tank is 1~20 min. Through the heating and high-speed stirring at this stage, the macromolecule powder material is uniformly dispersed, static electricity is eliminated, and the coverage rate of the carbon black is improved.

At the second stage, the temperature of the powder mixing tank is maintained at 30~40° C., the stirring rate of the powder mixing tank is 600~800 r/min, and the stirring time of the powder mixing tank is 3~150 min. In the environment with lower temperature and lower stirring speed than those at the first stage, after a longer time of stirring and mixing, the carbon black and the macromolecule powder material are mixed more uniformly, preventing friction inside the macromolecule powder material. If being in the high temperature and high speed environment, the macromolecule powder is easy to be broken or cracked, which affects the morphology of the powder.

As a further preferred solution of the present disclosure, the carbon black has an average particle size of 60~1000 nm. As a further preferred solution of the present disclosure, the carbon black has an average particle size of 60~100 nm. When the particle size of the carbon black is too large, it will have a poor adhesion, which will affect the adhesion of the carbon black on the surface of macromolecule powder material. In the present disclosure, the average particle size of the carbon black is limited to 60~1000 nm or 60~100 nm. Therefore, the small-particle nano carbon black has larger specific surface force, absorbs more laser energy, and has better heat absorption efficiency.

As a further preferred solution of the present disclosure, a coverage rate of the carbon black on a surface of the macromolecule powder material is 20%~500%. The surface coverage rate of the carbon black is high, and the carbon black can cover the surface of the macromolecule powder uniformly, and have higher energy absorption efficiency.

As a further preferred solution of the present disclosure, a coverage rate of the carbon black on a surface of the macromolecule powder material is 20%~200%. A coverage rate of the carbon black on a surface of the first thermal medium material is 30%~300%.

As a further preferred solution of the present disclosure, a coverage rate of the carbon black on a surface of the polyamide powder material is 20%~100%. In this solution, the coverage rate of the carbon black is limited to no more than 100%, in order to allow more laser energy to be absorbed by the thermal medium in the polyamide powder material, without hindering the heat absorption effect of the thermal medium, and to exert the heat absorption function and efficiency of the thermal medium as much as possible. The carbon black as the thermal medium is covered on the surface of the polyamide powder material, by limiting the coverage rate of the carbon black, the polyamide powder material is melted more completely, and the heat absorption efficiency of the entire heat absorption material is greatly improved.

As a further preferred solution of the present disclosure, the first thermal medium material is carbon fiber, ferric oxide powder, ferroferric oxide powder, or metal powder.

As a further preferred solution of the present disclosure, the metal powder is one or more selected from a group consisting of iron powder, aluminum powder, copper powder, tungsten powder, nickel powder, cobalt powder, titanium powder.

As a further preferred solution of the present disclosure, the first thermal medium material has an average particle size of 10~45 μm.

As a further preferred solution of the present disclosure, the macromolecule polymer powder material has an average particle size of 40~75 μm. Within the particle size range of the macromolecule polymer powder material defined by the disclosure, the powder has good fluidity and can ensure that the carbon black is uniformly distributed on the surface of the macromolecule powder. The carbon black is easy to agglomerate due to too small particle size of the macromolecule polymer powder material, thereby affecting the mechanical properties of the workpieces formed by sintering the powder. Too large particle size of the macromolecule polymer powder material can easily result in a small coverage rate of the carbon black, and thus the laser energy absorption efficiency is poor.

As a further preferred solution of the present disclosure, the macromolecule powder material is polyamide powder material, thermoplastic polyurethane powder material, polypropylene powder material, polyethylene powder material, ethylene-vinyl acetate copolymer powder material, polyethersulfone powder material, polyphenylene sulfide powder material, or polyether ether ketone powder material. In the macromolecule polymers, a few materials such as polyamide have a high absorption rate for the laser produced by the $CO_2$ laser, but there are still a large number of macromolecule polymers that have a poor absorption rate for the laser in this wavelength range, which leads to the types of macromolecule polymer materials that can be applied in selective laser sintering technology currently are still very limited. Through the technical solutions of the present disclosure, the range of the macromolecule polymer powder materials applicable for the selective laser sintering technology is significantly broadened.

As a further preferred solution of the present disclosure, the macromolecule powder material is a thermosetting resin powder. The thermosetting resin powder is phenolic resin powder, urea resin powder, melamine-formaldehyde resin powder, epoxy resin powder, unsaturated resin powder, polyurethane powder, or polyimide powder.

As a further preferred solution of the present disclosure, the polyamide powder material is one or more selected from the group consisting of Polyamide 6 (PA6), Polyamide 11 (PA11), Polyamide 12 (PA12), Polyamide 66 (PA66), Polyamide 610 (PA610), Polyamide 612 (PA612), Polyamide 1010 (PA1010), Polyamide 1012 (PA1012), and Polyamide 1212 (PA1212).

As a further preferred solution of the present disclosure, the polyamide powder material is a binary or ternary copolymerized polyamide powder. The polyamide powder material is copolymerized by two or three salts selected from the group consisting of caprolactam, ω-aminoundecanoic acid, laurolactam, PA6 salt, PA66 salt, PA610 salt, PA612 salt, PA1010 salt, PA1012 salt, and PA1212 salt. The binary or ternary copolymerized polyamide powder has low crystallinity, better sintering copolymer toughness and lower enthalpy value. The polyamide powder material is more suitable for being sintered by the fiber laser.

As a further preferred solution of the present disclosure, the flow aid is fumed silica, fumed alumina, or nano titanium dioxide.

As a further preferred solution of the present disclosure, the surface functional group of the carbon black is carboxyl group, benzoquinone group, phenolic group, hydroxyl group, aldehyde group, amide group, carboxylate, or ether group. The surface functional group of the carbon black can react with the carbon black during the powder preparation by the solvent method. The carbon black can be combined with molecular chains of the polyamide more tightly, so that the carbon black can further increase the toughness of the material to a certain extent. Moreover, the carbon black is uniformly dispersed in the polyamide powder, so that the carbon black absorbs the laser energy well. The entire powder can be melted. The toughness of the sintered part is better, and the impact resistance thereof is improved.

The present disclosure further provides a macromolecule polymer powder material, which is prepared by the method of preparing the macromolecule polymer powder material as described above. The macromolecule polymer powder material is applicable for being sintered through a fiber laser.

As a further preferred solution of the present disclosure, a laser power of the fiber laser is 30~1000 W, a laser spot thereof has a size of 30~4500 μm, and a laser scanning speed thereof is 10 m/s to 30 m/s.

The present disclosure provides the method of preparing the macromolecular polymer powder material. The prepared macromolecular polymer powder material is applicable for being sintered through the fiber laser, and has the following beneficial effects.

(1) Through the high-speed stirring process of the present disclosure, the carbon black and the macromolecule polymer powder are uniformly dispersed, which prevents the carbon black from agglomerating, and further improves the fluidity of the macromolecule polymer powder. The coverage rate of the carbon black on the surface of the macromolecule powder material is extremely high, which is beneficial for the carbon black to absorb heat and transfer the heat to the surface of the macromolecule polymer powder.

(2) Through the high-speed stirring process of the present disclosure, the carbon black is uniformly coated on the surface of the macromolecule polymer, and the carbon black can efficiently absorb the energy of the fiber laser. In this way, the fiber laser with a smaller laser power and spot can also make the macromolecule polymer powder absorb enough energy to be melted. Finer macromolecule polymer workpieces can be prepared by selective laser sintering technology. The prepared macromolecule polymer workpiece has lower surface roughness, and can be used to prepare smaller-sized characters, smaller-sized hollow structures, smaller-sized cylinders, smaller-sized interconnected structures, and the like.

(3) Through the high-speed stirring process of the present disclosure, a smaller amount of carbon black can be added, so that the macromolecule polymer powder can absorb enough energy to be melted. The more the carbon black, the easier it is for the sintered polyamide to crystallize, which makes the warpage and shrinkage generated by the sintering more serious, seriously affecting the dimensional stability of the workpiece. The less the carbon black, the better the performance of the prepared workpiece. The performance of the workpieces formed by sintering the macromolecule polymer powder materials prepared by the stirring process in the present disclosure is greatly improved.

(4) By adding the thermal medium and the carbon black, the macromolecule polymer powder, that cannot absorb the energy of the laser or has poor absorption effect on the energy of the laser in the prior art, can be turned into the macromolecule polymer powder that can easily absorb the energy of the laser. The fiber laser can be used well for sintering to prepare the workpiece. Therefore, the material application type and application scope of this technology is broadened.

The macromolecular polymer powder material and the preparing method thereof according to the present disclosure further have the following beneficial effects.

The addition of the thermal medium can not only absorb the energy of the laser at the visible light wavelength to make the powder melted better, but also play a role in enhancing, so that the mechanical strength and modulus of the macromolecule polymer material are improved, while the impact resistance of the macromolecule polymer powder material can be better.

The method of preparing polyamide polymer powder material applicable for selective laser sintering according to the present disclosure further has the following beneficial effects.

(1) Through the powder preparation process of the present disclosure, the thermal medium can be coated by the polyamide powder, while the carbon black is uniformly coated on the surface of the polyamide powder. The thermal medium and the carbon black on the surface of the polyamide absorb the energy of the fiber laser efficiently. In this way, the fiber laser with a smaller laser power and spot can also make the polyamide powder absorb enough energy to be melted. Finer polyamide polymer workpieces can be prepared by the selective laser sintering technology. The prepared polyamide polymer workpiece has lower surface roughness, and can be used to prepare smaller-sized characters, smaller-sized hollow structures, smaller-sized cylinders, smaller-sized interconnected structures, and the like.

(2) Through the powder preparation process of the present disclosure, a smaller amount of the thermal medium and the carbon black can be added, so that the polyamide powder can absorb enough energy to be melted. Since the more thermal medium, the easier it is for the sintered polyamide to crystallize, the warpage and shrinkage generated by the sintering are more serious, which seriously affects the dimensional stability of the workpiece. The less the carbon black, the better the performance of the prepared workpiece. The performance of the workpieces formed by sintering the polyamide polymer powder materials prepared by the powder preparation process of the present disclosure is greatly improved.

(3) During the powder preparation process by a solvent method, the thermal medium is added. The thermal medium acts as a nucleating agent, and the molecular chain of the polyamide coats the thermal medium, to grow into the polyamide powder. In this way, not only the carbon black on the surface of the powder can absorb the energy of the fiber laser, but the thermal medium can also absorb the energy of the fiber laser, which can be beneficial to melt the entire polyamide powder. The sintered workpiece can have a better performance. Moreover, the thermal medium can also enhance the performance of the sintered workpiece, which further broadens the material application type and application scope of this technology.

Figure 4:
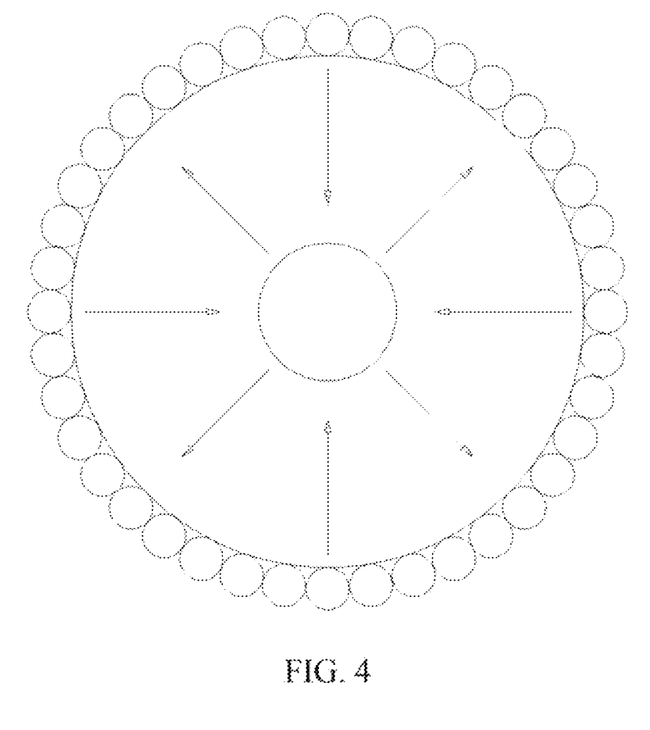
FIG. 4 is a schematic view of a heat absorption conduction of a polyamide polymer powder material according to the present disclosure.

(4) The inner surface and the outer surface of the polyamide polymer powder material prepared by the present disclosure both contain the thermal medium. The thermal medium on the inner surface is used as the nucleating agent. The carbon black is uniformly covered on the outer surface of the polyamide powder material. Therefore, a heat absorption conduction and thermal insulation temperature field in which the inner surface and the outer surface both contain the thermal medium is formed.

DETAILED DESCRIPTION OF THE EMBODIMENTS

Comparative Example 1

(1) 100 parts of Polyamide 1010 (PA1010) powder with an average particle size of 60 μm, 1 part of fumed silica agent, and 1 part of carbon black with an average particle size of 80 nm were mixed by a conventional low-speed stirring process to obtain a PA1010 powder for selective laser sintering.

Example 1

(1) 20 parts of PA1010 powder with an average particle size of 60 μm and 1 part of carbon black with an average particle size of 80 nm were added into a stirring tank for stirring. A temperature of the stirring tank was maintained at 30° C., a stirring rate thereof was 1500 r/min, and stirring time thereof was 1 min. Therefore, a PA1010 carbon black mixed powder was obtained.

(2) 20 parts of the PA1010 carbon black mixed powder, 1 part of fumed silica, and 80 parts of the PA1010 powder were added into a powder mixing tank, and then sieved with an average particle size of 60 μm, after being subjected to a high-speed stirring process. At a first stage of the high-speed stirring, a temperature of the powder mixing tank was maintained at 70° C., a stirring rate thereof was 1500 revolutions/min, and stirring time thereof was 1 min. At a second stage of the high-speed stirring, the temperature of the powder mixing tank was maintained at 40° C., the stirring rate thereof was 600 revolutions/min, and the stirring time thereof was 5 min. Therefore, a PA1010 polymer powder material was obtained.

A fiber laser was used to sinter the prepared PA1010 polymer powder material to obtain a sintered workpiece sample. A performance test was performed on the sintered workpiece sample. The results are shown in Table 1.

Example 2

(1) 20 parts of Polyamide 6 (PA6) powder with an average particle size of 75 μm and 5 parts of carbon black with an average particle size of 60 nm were added into a stirring tank for stirring. A temperature of the stirring tank was maintained at 40° C., a stirring rate thereof was 2000 r/min, and stirring time thereof was 0.5 min. Therefore, a PA6 carbon black mixed powder was obtained.

(2) 20 parts of the PA6 carbon black mixed powder, 0.5 part of fumed titanium dioxide, and 80 parts of the PA6 powder were added into a powder mixing tank, and then sieved with an average particle size of 75 μm, after being subjected to a high-speed stirring process. At a first stage of the high-speed stirring, a temperature of the powder mixing tank was maintained at 75° C., a stirring rate thereof was 1400 revolutions/min, and stirring time thereof was 1.5 min. At a second stage of the high-speed stirring, the temperature of the powder mixing tank was maintained at 35° C., the stirring rate thereof was 700 revolutions/min, and the stirring time thereof was 4 min. Therefore, a PA6 polymer powder material was obtained.

A fiber laser was used to sinter the prepared PA6 polymer powder material to obtain a sintered workpiece sample. A performance test was performed on the sintered workpiece sample. The results are shown in Table 1.

Example 3

(1) 20 parts of thermoplastic polyurethane powder with an average particle size of 40 μm and 0.1 part of carbon black with an average particle size of 200 nm were added into a stirring tank for stirring. A temperature of the stirring tank was maintained at 30° C., a stirring rate thereof was 2000 r/min, and stirring time thereof was 5 min. Therefore, a thermoplastic polyurethane carbon black mixed powder was obtained.

(2) 20 parts of the thermoplastic polyurethane carbon black mixed powder, 0.1 part of fumed alumina, and 80 parts of thermoplastic polyurethane powder were added into a powder mixing tank, and then sieved with an average particle size of 40 μm, after being subjected to a high-speed stirring process. At a first stage of the high-speed stirring, a temperature of the powder mixing tank was maintained at 80° C., a stirring rate thereof was 1200 revolutions/min, and stirring time thereof was 20 min. At a second stage of the high-speed stirring, the temperature of the powder mixing tank was maintained at 30° C., the stirring rate thereof was 800 revolutions/min, and the stirring time thereof was 150 min. Therefore, a thermoplastic polyurethane polymer powder material was obtained.

A fiber laser was used to sinter the prepared thermoplastic polyurethane polymer powder material to obtain a sintered workpiece sample. A performance test was performed on the sintered workpiece sample. The results are shown in Table 1.

Example 4

(1) 20 parts of polypropylene powder material with an average particle size of 45 μm and 0.5 part of carbon black with an average particle size of 300 nm were added into a stirring tank for stirring. A temperature of the stirring tank was maintained at 35° C., a stirring rate thereof was 1600 r/min, and stirring time thereof was 2 min. Therefore, a polypropylene resin carbon black mixed powder was obtained.

(2) 20 parts of the polypropylene resin carbon black mixed powder, 0.2 part of fumed silica, and 80 parts of polypropylene powder material were added into a powder mixing tank, and then sieved with an average particle size of 45 μm, after being subjected to a high-speed stirring process. At a first stage of the high-speed stirring, a temperature of the powder mixing tank was maintained at 70° C., a stirring rate thereof was 1300 revolutions/min, and stirring time thereof was 5 min. At a second stage of the high-speed stirring, the temperature of the powder mixing tank was maintained at 35° C., the stirring rate thereof was 760 revolutions/min, and the stirring time thereof was 15 min. Therefore, a polypropylene resin polymer powder material was obtained.

A fiber laser was used to sinter the prepared polypropylene resin polymer powder material to obtain a sintered workpiece sample. A performance test was performed on the sintered workpiece sample. The results are shown in Table 1.

Example 5

(1) 20 parts of polyethylene powder material with an average particle size of 50 μm and 1 part of carbon black with an average particle size of 500 nm into a stirring tank for stirring. A temperature of the stirring tank was maintained at 36° C., a stirring rate thereof was 1700 r/min, and stirring time thereof was 3 min. Therefore, a polyethylene resin carbon black mixed powder was prepared.

(2) 20 parts of the polyethylene resin carbon black mixed powder, 0.3 part of fumed silica, and 80 parts of the polyethylene powder material were added into a powder mixing tank, and then sieved with an average particle size of 50 μm, after being subjected to a high-speed stirring process. At a first stage of the high-speed stirring, a temperature of the powder mixing tank was maintained at 80° C., a stirring rate thereof was 1200 revolutions/min, and stirring time thereof was 10 min. At a second stage of the high-speed stirring, the temperature of the powder mixing tank was maintained at 30° C., the stirring rate thereof was 800 revolutions/min, and the stirring time thereof was 35 min. Therefore, a polyethylene resin polymer powder material was obtained.

A fiber laser was used to sinter the prepared polyethylene resin polymer powder material to obtain a sintered workpiece sample. A performance test was performed on the sintered workpiece sample. The results are shown in Table 1.

Example 6

(1) 20 parts of polyethersulfone powder material with an average particle size of 65 μm and 5 parts of carbon black with an average particle size of 90 nm were added into a stirring tank for stirring. A temperature of the stirring tank was maintained at 40° C., a stirring rate thereof was 1900 r/min, and stirring time thereof was 4 min. Therefore, a polyethersulfone resin carbon black mixed powder was obtained.

(2) 20 parts of the polyethersulfone resin carbon black mixed powder, 0.1 part of fumed silica, and 80 parts of the polyethersulfone powder material were added into a powder mixing tank, and then sieved with an average particle size of 650 μm, after being subjected to a high-speed stirring process. At a first stage of the high-speed stirring, a temperature of the powder mixing tank was maintained at 80° C., a stirring rate thereof was 1200 revolutions/min, and stirring time thereof was 15 min. At a second stage of the high-speed stirring, the temperature of the powder mixing tank was maintained at 30° C., the stirring rate thereof was 800 revolutions/min, and the stirring time thereof was 60 min. Therefore, a polyethersulfone resin polymer powder material was obtained.

A fiber laser was used to sinter the prepared polyethersulfone resin polymer powder material to obtain a sintered workpiece sample. A performance test was performed on the sintered workpiece sample. The results are shown in Table 1.

Example 7

(1) 20 parts of polyphenylene sulfide powder material with an average particle size of 70 μm and 10 parts of carbon black with an average particle size of 1000 nm were added into a stirring tank for stirring. A temperature of the stirring tank was maintained at 40° C., a stirring rate thereof was 2000 r/min, and stirring time thereof was 2 min. Therefore, a polyphenylene sulfide resin carbon black mixed powder was obtained.

(2) 20 parts of the polyphenylene sulfide resin carbon black mixed powder, 1 part of fumed silica, and 80 parts of the polyphenylene sulfide powder materials were added into a powder mixing tank, and then sieved with an average particle size of 70 μm, after being subjected to a high-speed stirring process. At a first stage of the high-speed stirring, a temperature of the powder mixing tank was maintained at 75° C., a stirring rate thereof was 1200 revolutions/min, and stirring time thereof was 16 min. At a second stage of the high-speed stirring, the temperature of the powder mixing tank was maintained at 40° C., the stirring rate thereof was 600 revolutions/min, and the stirring time thereof was 100 min. Therefore, a polyphenylene sulfide resin polymer powder material was obtained.

A fiber laser was used to sinter the prepared polyphenylene sulfide resin polymer powder material to obtain a sintered workpiece sample. A performance test was performed on the sintered workpiece sample. The results are shown in Table 1.

Example 8

(1) 20 parts of polyether ether ketone powder material with an average particle size of 75 μm and 8 parts of carbon black with an average particle size of 200 nm were added into a stirring tank for stirring. A temperature of the stirring tank was maintained at 30° C., a stirring rate thereof was 2000 r/min, and stirring time thereof was 4 min. Therefore, a polyether ether ketone resin carbon black mixed powder was obtained.

(2) 20 parts of the polyether ether ketone resin carbon black mixed powder, 0.1 part of fumed silica, and 80 parts of the thermoplastic polyether ether ketone powder material were added into a powder mixing tank, and then sieved with an average particle size of 75 μm, after being subjected to a high-speed stirring process. At a first stage of the high-speed stirring, a temperature of the powder mixing tank was maintained at 80° C., a stirring rate thereof was 1400 revolutions/min, and stirring time thereof was 20 min. At a second stage of the high-speed stirring, the temperature of the powder mixing tank was maintained at 35° C., the stirring rate thereof was 700 revolutions/min, and the stirring time thereof was 120 min. Therefore, a polyether ether ketone resin polymer powder material was obtained.

A fiber laser was used to sinter the prepared polyether ether ketone resin polymer powder material to obtain a sintered workpiece sample. A performance test was performed on the sintered workpiece sample. The results are shown in Table 1.

TABLE 1

Performance parameters of three-dimensional parts prepared by using the macromolecule polymer powder materials of the present disclosure

| Examples | Surface coverage rate of the carbon black (%) | Tensile strength (Mpa) | Tensile elongation at break (%) | Surface roughness (μm) | | | Minimum thickness of wall (mm) |
|---|---|---|---|---|---|---|---|
| | | | | Upper surface | Lower surface | Side surface | |
| Comparative example I | 15 | 55 | 22 | 11 | 10 | 14 | 0.5 |
| Example 1 | 97 | 60 | 45 | 4 | 4 | 5 | 0.05 |
| Example 2 | 190 | 75 | 22 | 3 | 4 | 6 | 0.08 |
| Example 3 | 20 | 42 | 413 | 6 | 6 | 10 | 0.2 |
| Example 4 | 50 | 36 | 65 | 3 | 3 | 5 | 0.15 |
| Example 5 | 101 | 15 | 90 | 5 | 3 | 6 | 0.2 |
| Example 6 | 198 | 85 | 10 | 6 | 5 | 6 | 0.2 |
| Example 7 | 500 | 88 | 5 | 8 | 7 | 7 | 0.2 |
| Example 8 | 360 | 95 | 5 | 7 | 6 | 6 | 0.2 |

Through the stirring process of the present disclosure, the carbon black and the macromolecule polymer powder are uniformly dispersed, which prevents the carbon black from agglomerating, and further improves the fluidity of the macromolecule polymer powder. The coverage rate of the carbon black on a surface of the macromolecule powder material is extremely high, which is beneficial for the carbon black to absorb heat and transfer the heat to the surface of the macromolecule polymer powder, so that the macromolecule polymer powder can be melted more fully.

The carbon black is uniformly coated on a surface of the polyamide powder, and the carbon black absorbs the energy of the fiber laser efficiently. In this way, a fiber laser with a smaller laser power and spot can also make the macromolecule polymer powder absorb enough energy to be melted. Finer macromolecule polymer workpieces can be prepared by selective laser sintering technology. The prepared macromolecule polymer workpiece has lower surface roughness, and can be used to prepare smaller-sized characters, smaller-sized hollow structures, smaller-sized cylinders, smaller-sized interconnected structures, and the like.

By adding a smaller amount of the carbon black, the macromolecule polymer powder can absorb enough energy to be melted. In the macromolecule polymer powder materials, the more the content of the carbon black, the easier it is for the sintered macromolecule polymer powder material to crystallize, which makes the warpage and shrinkage of the sintered workpiece more serious, seriously affecting the dimensional stability of the workpiece. The less the content of the carbon black, the better the performance of the prepared workpiece. The performance of the workpieces formed by sintering the macromolecule polymer powder materials prepared by the stirring process in the present disclosure is greatly improved.

By adding the carbon black, the macromolecule polymer powder, that cannot absorb the energy of the laser or has poor absorption effect on the energy of the laser in the prior art, can be turned into the macromolecule polymer powder that can easily absorb the energy of the laser. The fiber laser can be used well for sintering to prepare the workpiece. Therefore, the material application type and application scope of this technology is broadened.

Figure 1:
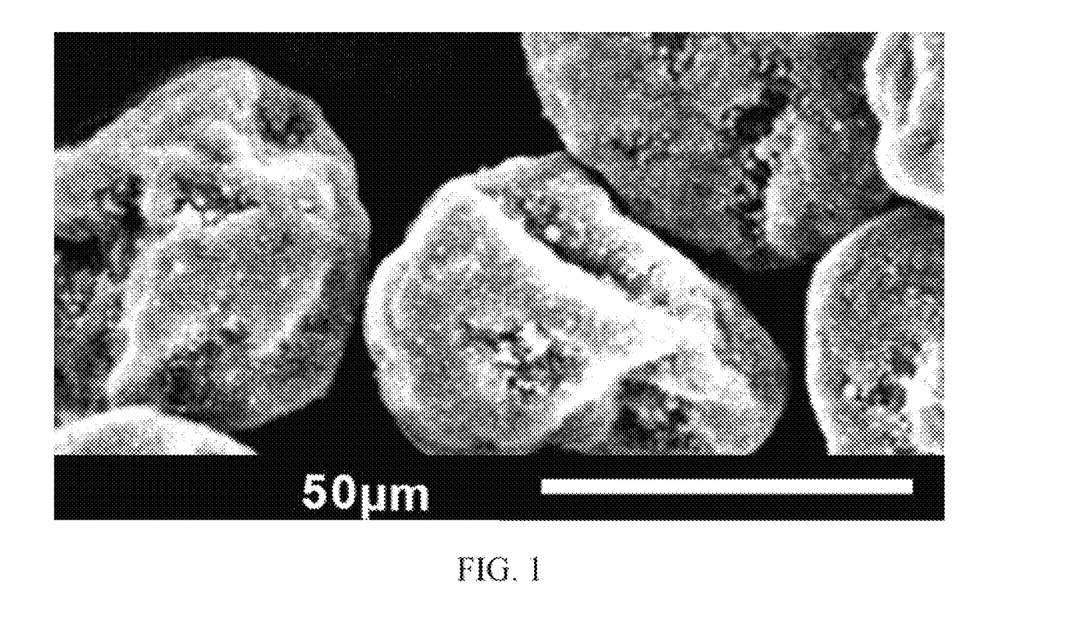
FIG. 1 is a scanning electron microscope (SEM) image of a macromolecule polymer powder material according to the present disclosure.
Figure 2:
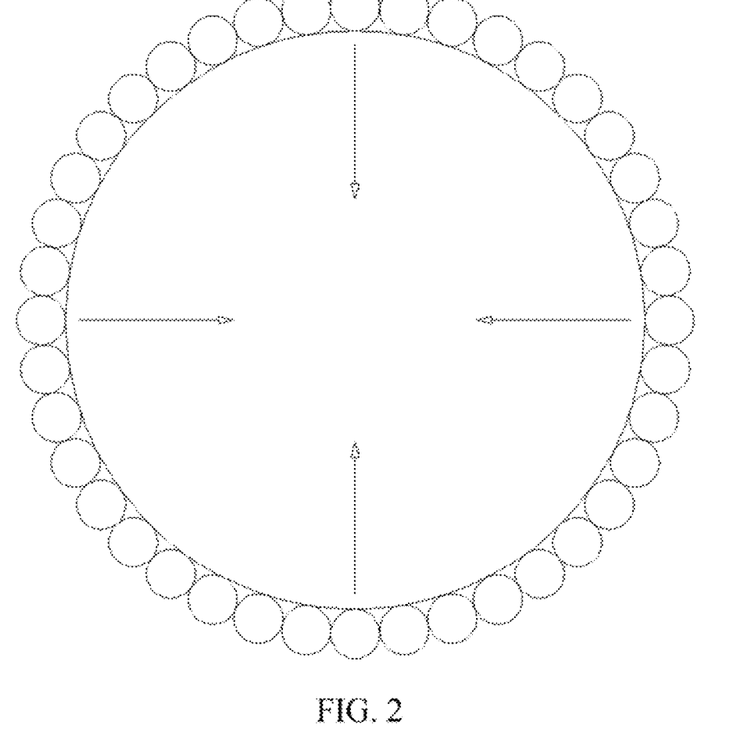
FIG. 2 is a schematic view of a heat absorption conduction of a macromolecule polymer powder material according to the present disclosure.
Figure 3:
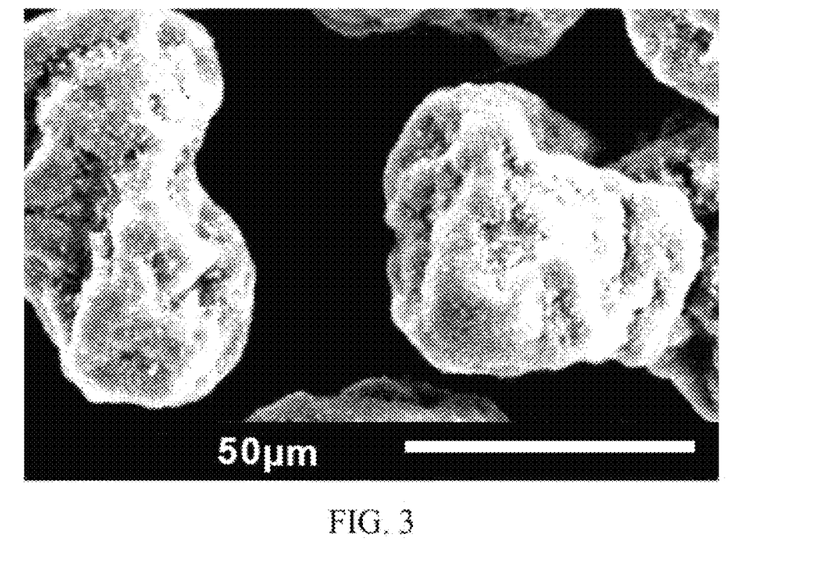
FIG. 3 is a SEM image of a polyamide polymer powder material according to the present disclosure.

An outer surface of the macromolecule polymer powder material prepared by the present disclosure is uniformly covered with the carbon black. Referring to FIG. 2 for details, there are two sizes of circles in FIG. 2. The largest circle represents the macromolecule powder material, and the smallest circle represents the carbon black. The carbon black is uniformly covered on the outer surface of the macromolecule powder material. An inward-pointing arrow represents a schematic directional diagram of the thermal conduction from the carbon black to the macromolecule powder material. It is obvious that the carbon black is uniformly covered on the outer surface of the macromolecule powder material, which forms a thermal conduction and thermal insulation temperature field. The carbon black absorbs the energy of the fiber laser efficiently, such that the macromolecule polymer powder material is easier to absorb the laser energy.

In the embodiments of the present disclosure, a laser power of the fiber laser is preferably 30 W to 1000 W, the laser spot has a size of 30 μm to 1500 μm, and the laser is controlled at a speed of about 10 m/s to 30 m/s to irradiate a cross-sectional area of the three-dimensional part. After the fusion of one layer is completed under the irradiation of the laser, a powder spreader spreads mixed powder of polyamide and carbon fiber on a working plane with a thickness of 0.1 mm to 0.2 mm. The laser continues to irradiate a cross-sectional area of the three-dimensional part on a new powder layer. The above steps are repeated until a three-dimensional part prepared by the macromolecular polymer powder material is obtained. It is found that the prepared three-dimensional part has a better performance at the characteristic structure compared to being prepared by using a $CO_2$ laser.

It is worth noting that in this embodiment, the limitations for the parameters of the fiber laser and the thickness of the spreading powder are both preferred, and do not constitute limitations on the parameters of the fiber laser applied to the macromolecule polymer powder material prepared by the present disclosure and the thickness of the spreading powder. The conditions of other parameters of the fiber laser and thickness of the spreading powder which are not listed in the embodiments of the present disclosure are also applicable.

It is worth noting that, in the present disclosure, the parts of all components represent the parts by mass. In the present disclosure, the carbon black is preferably used as the thermal medium for thermal conduction of the macromolecule powder materials. The performance of the workpieces is excellent. Obviously, the thermal medium for thermal conduction of the macromolecule powder materials can also be graphite, graphene, carbon fiber, ferric oxide powder, ferroferric oxide powder, or metal powder. The conventional replacements of the thermal medium for thermal conduction of the macromolecule powder materials are also fallen within the protection scope of the present disclosure. Embodiments in which the above-mentioned alternative thermal medium materials are used are not repeated herein.

Comparative Example 2

(1) 100 parts of Polyamide 1212 (PA1212) powder with an average particle size of 60 μm, 1 part of fumed silica agent, 20 parts of carbon fiber with an average particle size of 40 μm, and 1 part of carbon black with an average particle size of 80 nm were mixed by stirring, to obtain a PA1212 powder for selective laser sintering.

Example 9

(1) 10 parts of PA1212 powder with an average particle size of 60 μm and 1 part of carbon black with an average particle size of 60 nm were added into a stirring tank for stirring. A temperature of the stirring tank was maintained at 30° C., a stirring rate thereof was 2000 r/min, and stirring time thereof was 0.5 min. Therefore, a PA1212 carbon black mixed powder was obtained.

(2) 10 parts of the PA1212 carbon black mixed powder, 1 part of fumed silica, 20 parts of carbon fiber with an average particle size of 40 μm, and 90 parts of the PA1212 powder were added into a powder mixing tank, and then sieved with an average particle size of 60 μm, after being subjected to a high-speed stirring process. At a first stage of the high-speed stirring, a temperature of the powder mixing tank was maintained at 70° C., a stirring rate thereof was 1500 r/min, and stirring time thereof was 2 min. At a second stage of the high-speed stirring, the temperature of the powder mixing tank was maintained at 40° C., the stirring rate thereof was 800 r/min, and the stirring time thereof was 3 min. Therefore, a PA1212 polymer powder material was obtained.

A fiber laser was used to sinter the prepared PA1212 polymer powder material to obtain a sintered workpiece sample. A performance test was performed on the sintered workpiece sample. The results are shown in Table 2.

Example 10

(1) 5 parts of PA6 powder with an average particle size of 40 nm and 0.1 part of carbon black with an average particle size of 60 nm were added into a stirring tank for stirring. A temperature of the stirring tank was maintained at 32° C., a stirring rate thereof was 1600 r/min, and stirring time thereof was 1 min. Therefore, a PA6 carbon black mixed powder was obtained.

(2) 10 parts of the PA6 carbon black mixed powder, 0.1 part of fumed titanium dioxide, 5 parts of ferric oxide powder with an average particle size of 10 μm, and 90 parts of the PA6 powder were added into a powder mixing tank, and then sieved with an average particle size of 40 μm, after being subjected to a high-speed stirring process. At a first stage of the high-speed stirring, a temperature of the powder mixing tank was maintained at 72° C., a stirring rate thereof was 1300 r/min, and stirring time thereof was 3 min. At a second stage of the high-speed stirring, the temperature of the powder mixing tank was maintained at 33° C., the stirring rate thereof was 640 r/min, and the stirring time thereof was 5 min. Therefore, a PA6 polymer powder material was obtained.

A fiber laser was used to sinter the prepared PA6 polymer powder material to obtain a sintered workpiece sample. A performance test was performed on the sintered workpiece sample. The results are shown in Table 2.

Example 11

(1) 20 parts of thermoplastic polyurethane powder with an average particle size of 40 μm and 0.1 part of carbon black with an average particle size of 65 nm were added into a stirring tank for stirring. A temperature of the stirring tank was maintained at 40° C., a stirring rate thereof was 1500 r/min, and stirring time thereof was 2 min. Therefore, a thermoplastic polyurethane carbon black mixed powder was obtained.

(2) 20 parts of the thermoplastic polyurethane carbon black mixed powder, 0.1 part of fumed alumina, 10 parts of ferroferric oxide powder with an average particle size of 15 μm, and 80 parts of thermoplastic polyurethane powder were added into a powder mixing tank, and then sieved with an average particle size of 40 μm, after being subjected to a high-speed stirring process. At a first stage of the high-speed stirring, a temperature of the powder mixing tank was maintained at 80° C., a stirring rate thereof was 1200 revolutions/min, and stirring time thereof was 5 min. At a second stage of the high-speed stirring, the temperature of the powder mixing tank was maintained at 30° C., the stirring rate thereof was 800 revolutions/min, and the stirring time thereof was 15 min. Therefore, a thermoplastic polyurethane polymer powder material was obtained.

A fiber laser was used to sinter the prepared thermoplastic polyurethane polymer powder material to obtain a sintered workpiece sample. A performance test was performed on the sintered workpiece sample. The results are shown in Table 2.

Example 12

(1) 20 parts of polypropylene powder material with an average particle size of 45 μm and 0.5 part of carbon black with an average particle size of 70 nm were added into a stirring tank for stirring. A temperature of the stirring tank was maintained at 35° C., a stirring rate thereof was 1600 r/min, and stirring time thereof was 2 min. Therefore, a polypropylene resin carbon black mixed powder was obtained.

(2) 20 parts of the polypropylene resin carbon black mixed powder, 0.2 part of fumed silica, 15 parts of iron powder with an average particle size of 20 μm, and 80 parts of the polypropylene powder material were added into a powder mixing tank, and then sieved with an average particle size of 45 μm, after being subjected to a high-speed stirring process. At a first stage of the high-speed stirring, a temperature of the powder mixing tank was maintained at 70° C., a stirring rate thereof was 1300 revolutions/min, and stirring time thereof was 8 min. At a second stage of the high-speed stirring, the temperature of the powder mixing tank was maintained at 35° C., the stirring rate thereof was 760 revolutions/min, and the stirring time thereof was 30 min. Therefore, a polypropylene resin polymer powder material was obtained.

A fiber laser was used to sinter the prepared polypropylene resin polymer powder material to obtain a sintered workpiece sample. A performance test was performed on the sintered workpiece sample. The results are shown in Table 2.

Example 13

(1) 20 parts of polyethylene powder material with an average particle size of 50 μm and 1 part of carbon black with an average particle size of 75 nm into a stirring tank for stirring. A temperature of the stirring tank was maintained at 36° C., a stirring rate thereof was 1700 r/min, and stirring time thereof was 3 min. Therefore, a polyethylene resin carbon black mixed powder was obtained.

(2) 20 parts of the polyethylene resin carbon black mixed powder, 0.3 part of fumed silica, 20 parts of copper powder with an average particle size of 25 μm, and 80 parts of the polyethylene powder material were added into a powder mixing tank, and then sieved with an average particle size of 50 μm, after being subjected to a high-speed stirring process. At a first stage of the high-speed stirring, a temperature of the powder mixing tank was maintained at 80° C., a stirring rate thereof was 1200 revolutions/min, and stirring time thereof was 10 min. At a second stage of the high-speed stirring, the temperature of the powder mixing tank was maintained at 30° C., the stirring rate thereof was 800 revolutions/min, and the stirring time thereof was 45 min. Therefore, a polyethylene resin polymer powder material was obtained.

A fiber laser was used to sinter the prepared polyethylene resin polymer powder material to obtain a sintered workpiece sample. A performance test was performed on the sintered workpiece sample. The results are shown in Table 2.

Example 14

(1) 20 parts of polyethersulfone powder material with an average particle size of 65 μm and 3 parts of carbon black with an average particle size of 90 nm were added into a stirring tank for stirring. A temperature of the stirring tank was maintained at 40° C., a stirring rate thereof was 1900 r/min, and stirring time thereof was 4 min. Therefore, a polyethersulfone resin carbon black mixed powder was obtained.

(2) 20 parts of the polyethersulfone resin carbon black mixed powder, 0.1 part of fumed silica, 25 parts of nickel powder with an average particle size of 30 μm, and 80 parts of the polyethersulfone powder material were added into a powder mixing tank, and then sieved with an average particle size of 650 μm, after being subjected to a high-speed stirring process. At a first stage of the high-speed stirring, a temperature of the powder mixing tank was maintained at 80° C., a stirring rate thereof was 1200 revolutions/min, and stirring time thereof was 14 min. At a second stage of the high-speed stirring, the temperature of the powder mixing tank was maintained at 30° C., the stirring rate thereof was 800 revolutions/min, and the stirring time thereof was 60 min. Therefore, a polyethersulfone resin polymer powder material was obtained.

A fiber laser was used to sinter the prepared polyethersulfone resin polymer powder material to obtain a sintered workpiece sample. A performance test was performed on the sintered workpiece sample. The results are shown in Table 2.

Example 15

(1) 20 parts of polyphenylene sulfide powder material with an average particle size of 70 μm and 5 parts of carbon black with an average particle size of 100 nm were added into a stirring tank for stirring. A temperature of the stirring tank was maintained at 40° C., a stirring rate thereof was 2000 r/min, and stirring time thereof was 5 min. Therefore, a polyphenylene sulfide resin carbon black mixed powder was obtained.

(2) 20 parts of the polyphenylene sulfide resin carbon black mixed powder, 1 part of fumed silica, 30 parts of the cobalt powder with an average size of 35 μm, and 80 parts of the polyphenylene sulfide powder materials were added into a powder mixing tank, and then sieved with an average particle size of 70 μm, after being subjected to a high-speed stirring process. At a first stage of the high-speed stirring, a temperature of the powder mixing tank was maintained at 75° C., a stirring rate thereof was 1200 revolutions/min, and stirring time thereof was 18 min. At a second stage of the high-speed stirring, the temperature of the powder mixing tank was maintained at 40° C., the stirring rate thereof was 600 revolutions/min, and the stirring time thereof was 100 min. Therefore, a polyphenylene sulfide resin polymer powder material was obtained.

A fiber laser was used to sinter the prepared polyphenylene sulfide resin polymer powder material to obtain a sintered workpiece sample. A performance test was performed on the sintered workpiece sample. The results are shown in Table 2.

Example 16

(1) 20 parts of polyether ether ketone powder material with an average particle size of 75 μm and 3 parts of carbon black with an average particle size of 100 nm were added into a stirring tank for stirring. A temperature of the stirring tank was maintained at 30° C., a stirring rate thereof was 2000 r/min, and stirring time thereof was 5 min. Therefore, a polyether ether ketone resin carbon black mixed powder was obtained.

(2) 20 parts of the polyether ether ketone resin carbon black mixed powder, 0.1 part of fumed silica, 40 parts of tungsten powder with an average size of 45 μm, and 80 parts of the thermoplastic polyether ether ketone powder material were added into a powder mixing tank, and then sieved with an average particle size of 75 μm, after being subjected to a high-speed stirring process. At a first stage of the high-speed stirring, a temperature of the powder mixing tank was maintained at 80° C., a stirring rate thereof was 1400 revolutions/min, and stirring time thereof was 20 min. At a second stage of the high-speed stirring, the temperature of the powder mixing tank was maintained at 35° C., the stirring rate thereof was 700 revolutions/min, and the stirring time thereof was 150 min. Therefore, a polyether ether ketone resin polymer powder material was obtained.

A fiber laser was used to sinter the prepared polyether ether ketone resin polymer powder material to obtain a sintered workpiece sample. A performance test was performed on the sintered workpiece sample. The results are shown in Table 2.

TABLE 2

Performance parameters of three-dimensional parts prepared by using the macromolecule polymer powder materials of the present disclosure

| Examples | Surface coverage rate of the carbon black on the macromolecule polymer (%) | Tensile strength (Mpa) | Tensile elongation at break (%) | Tensile modulus (MPa) | Impact (KJ/m²) Gap | Impact (KJ/m²) No gap |
|---|---|---|---|---|---|---|
| Comparative example 2 | 12 | 46 | 2 | 3200 | 12 | 3 |
| Example 9 | 85 | 48 | 35 | 4500 | 136 | 25 |
| Example 10 | 200 | 81 | 12 | 4200 | 85 | 15 |
| Example 11 | 20 | 45 | 385 | 320 | Cannot be broken out | Cannot be broken out |
| Example 12 | 62 | 39 | 55 | 3100 | Cannot be broken out | Cannot be broken out |
| Example 13 | 78 | 18 | 60 | 265 | Cannot be broken out | Cannot be broken out |
| Example 14 | 154 | 109 | 7 | 7200 | 35 | 10 |
| Example 15 | 187 | 113 | 3 | 7800 | 26 | 7 |
| Example 16 | 113 | 126 | 2 | 8500 | 23 | 5 |

Through the stirring process of the present disclosure, the carbon black and the macromolecule polymer powder are uniformly dispersed, which prevents the carbon black from agglomerating. The carbon black is uniformly coated on the surface of the polyamide powder. The carbon black has high efficiency in absorbing the energy of the fiber laser.

By adding the thermal medium and the carbon black, the macromolecule polymer powder that cannot absorb the energy of the laser in the prior art, can be turned into the macromolecule polymer powder that can easily absorb the energy of the laser. The fiber laser can be used well for sintering to prepare the workpiece, which broadens the material application type and application scope of this technology. The addition of the thermal medium can not only absorb the energy of the laser at the visible light wavelength to make the powder melt better, but also play a role in enhancing, so that the mechanical strength and modulus of the macromolecule polymer material are improved, while the impact resistance of the macromolecule can be better.

By adding the carbon black, the macromolecule polymer powder that cannot absorb the energy of the laser in the prior art can be turned into the macromolecule polymer powder that can easily absorb the energy of the laser. The fiber laser can be used well for sintering to prepare the workpiece. The material application type and application scope of this technology are broadened. In the embodiments of the present disclosure, the laser power of the fiber laser is preferably 100 W to 300 W, the laser spot has a size of 40 μm to 60 μm, and the laser is controlled at a speed of about 10 m/s to 25 m/s to irradiate the cross-sectional area of the three-dimensional part. After the fusion of one layer is completed under the irradiation of the laser, a powder spreader spreads mixed powder of the polyamide and the carbon fiber on a working plane with a thickness of 0.1 mm to 0.2 mm. The laser continues to irradiate a cross-sectional area of the three-dimensional part on a new powder layer. The above steps are repeated until a three-dimensional part prepared by the macromolecular polymer powder material is obtained. It is found that the prepared three-dimensional part has a better performance at the characteristic structure compared to being prepared by using a $CO_2$ laser.

It is worth noting that in this embodiment, the limitations for the parameters of the fiber laser and the thickness of the spreading powder are both preferred, and do not constitute limitations on the parameters of the fiber laser applied to the macromolecule polymer powder material prepared by the present disclosure and the thickness of the spreading powder. The conditions of other parameters of the fiber laser and thickness of the spreading powder which are not listed in the embodiments of the present disclosure are also applicable.

Comparative Example 3

(1) 100 parts of PA1212 powder, 0.5 part of flow aid, and 1 part of carbon black with a particle size of 60 nm were mixed by a conventional low-speed stirring process, to obtain a PA1212 powder for selective laser sintering.

Example 17

(1) 100 parts of PA1212 granules, 1 part of carbon black with a particle size of 1 μm, and 600 parts of methanol were added into a polymerization kettle. The whole solvent precipitation method was divided into four stages. At a first stage, namely a heating and pressurizing stage, a stirring rate was controlled to 200 r/min, a temperature was raised to 200° C., and a pressure was raised to 1.8 Mpa. At a second stage, namely a cooling and depressurizing stage, the stirring rate was controlled to 600 r/min, the temperature was reduced to 100° C., and the pressure was reduced to 1.0 Mpa. At a third stage, the temperature and the pressure were maintained for 100 min, the stirring rate was controlled to 50 r/min, the temperature was maintained at 100° C., and the pressure was maintained at 1.0 MPa. At a fourth stage, the temperature and the pressure were quickly reduced to a normal temperature and pressure, and the stirring rate was 800 r/min. Finally, a polyamide powder grown up with a thermal medium as a nucleating agent was obtained, and a particle size of the obtained polyamide powder was 60 μm.

(2) 20 parts of PA1212 powder and 1 part of carbon black with a particle size of 60 nm were added into a stirring tank for stirring. A temperature of the stirring tank was maintained at 30° C., a stirring rate thereof was 2000 r/min, and stirring time thereof was 1 min. Therefore, a PA1212 carbon black mixed powder is obtained.

(3) 20 parts of the PA1212 carbon black mixed powder, 0.5 part of flow aid, and the remaining 80 parts of the PA1212 powder were added into a powder mixing tank, and then sieved with an average particle size of 60 μm, after being subjected to a high-speed stirring process. At a first stage of the high-speed stirring, a temperature of the powder mixing tank was maintained at 70° C., a stirring rate thereof was 1500 r/min, and stirring time thereof was 2 min. At a second stage of the high-speed stirring, the temperature of the powder mixing tank was maintained at 40° C., the stirring rate thereof was 600 r/min, and the stirring time thereof was 3 min. Therefore, a PA1212 polymer powder material was obtained.

A fiber laser was used to sinter the prepared PA1212 polymer powder material to obtain a sintered workpiece sample. A performance test was performed on the sintered workpiece sample. The results are shown in Table 3.

Example 18

(1) 100 parts of PA1010 granules, 0.1 part of graphene with a particle size of 0.1 μm, and 700 parts of ethanol were added into a polymerization kettle. The whole solvent precipitation method was divided into four stages. At a first stage, namely a heating and pressurizing stage, a stirring rate was controlled to 220 r/min, a temperature was raised to 200° C., and a pressure was raised to 1.8 Mpa. At a second stage, namely a cooling and depressurizing stage, the stirring rate was controlled to 520 r/min, the temperature was reduced to 110° C., and the pressure was reduced to 1.1 Mpa. At a third stage, the temperature and the pressure were maintained for 40 min, the stirring rate was controlled to 70 r/min, the temperature was maintained at 110° C., and the pressure was maintained at 1.1 MPa. At a fourth stage, the temperature and the pressure were quickly reduced to a normal temperature and pressure, and the stirring rate was 640 r/min. Finally, a polyamide powder grown up with a thermal medium as a nucleating agent was obtained, and a particle size of the obtained polyamide powder was 40 μm.

(2) 20 parts of PA1010 powder and 1.5 parts of carbon black with a particle size of 70 nm were added into a stirring tank for stirring. A temperature of the stirring tank was maintained at 33° C., a stirring rate thereof was 1600 r/min, and stirring time thereof was 0.5 min. Therefore, a PA1010 carbon black mixed powder is obtained.

(3) 20 parts of the PA1010 carbon black mixed powder, 0.1 part of flow aid, and the remaining 80 parts of the PA1010 powder were added into a powder mixing tank, and then sieved with an average particle size of 40 μm, after being subjected to a high-speed stirring process. At a first stage of the high-speed stirring, a temperature of the powder mixing tank was maintained at 73° C., a stirring rate thereof was 1400 r/min, and stirring time thereof was 5 min. At a second stage of the high-speed stirring, the temperature of the powder mixing tank was maintained at 34° C., the stirring rate thereof was 650 r/min, and the stirring time thereof was 20 min. Therefore, a PA1010 polymer powder material was obtained.

A fiber laser was used to sinter the prepared PA1010 polymer powder material to obtain a sintered workpiece sample. A performance test was performed on the sintered workpiece sample. The results are shown in Table 3.

Example 19

(1) 100 parts of PA6 granules, 10 parts of ferric oxide powder with a particle size of 10 μm, and 1000 parts of dimethylformamide were added into a polymerization kettle. The whole solvent precipitation method was divided into four stages. At a first stage, namely a heating and pressurizing stage, a stirring rate was controlled to 260 r/min, a temperature was raised to 200° C., and a pressure was raised to 1.8 Mpa. At a second stage, namely a cooling and depressurizing stage, the stirring rate was controlled to 570 r/min, the temperature was reduced to 120° C., and the pressure was reduced to 1.2 Mpa. At a third stage, the temperature and the pressure were maintained for 70 min, the stirring rate was controlled to 70 r/min, the temperature was maintained at 120° C., and the pressure was maintained at 1.2 MPa. At a fourth stage, the temperature and the pressure were quickly reduced to a normal temperature and pressure, and the stirring rate was 700 r/min. Finally, a PA6 powder grown up with a thermal medium as a nucleating agent was obtained, and a particle size of the obtained PA6 powder was 50 μm.

(2) 20 parts of PA6 powder and 1 part of carbon black with a particle size of 80 nm were added into a stirring tank for stirring. A temperature of the stirring tank was maintained at 37° C., a stirring rate thereof was 1800 r/min, and stirring time thereof was 3 min. Therefore, a PA6 carbon black mixed powder is obtained.

(3) 20 parts of the PA6 carbon black mixed powder, 0.7 part of flow aid, and the remaining 80 parts of the PA6 powder were added into a powder mixing tank, and then sieved with an average particle size of 50 μm, after being subjected to a high-speed stirring process. At a first stage of the high-speed stirring, a temperature of the powder mixing tank was maintained at 78° C., a stirring rate thereof was 1400 r/min, and stirring time thereof was 15 min. At a second stage of the high-speed stirring, the temperature of the powder mixing tank was maintained at 40° C., the stirring rate thereof was 770 r/min, and the stirring time thereof was 100 min. Therefore, a PA6 polymer powder material was obtained.

temperature was raised to 200° C., and a pressure was raised to 1.8 Mpa. At a second stage, namely a cooling and depressurizing stage, the stirring rate was controlled to 500 r/min, the temperature was reduced to 130° C., and the pressure was reduced to 1.3 Mpa. At a third stage, the temperature and the pressure were maintained for 100 min, the stirring rate was controlled to 100 r/min, the temperature was maintained at 130° C., and the pressure was maintained at 1.3 MPa. At a fourth stage, the temperature and the pressure were quickly reduced to a normal temperature and pressure, and the stirring rate was 600 r/min. Finally, a PA66 powder grown up with a thermal medium as a nucleating agent was obtained, and a particle size of the obtained PA66 powder was 75 μm.

(2) 20 parts of PA66 powder and 0.1 part of carbon black with a particle size of 100 nm were added into a stirring tank for stirring. A temperature of the stirring tank was maintained at 40° C., a stirring rate thereof was 1500 r/min, and stirring time thereof was 5 min. Therefore, a PA66 carbon black mixed powder is obtained.

(3) 20 parts of the PA66 carbon black mixed powder, 1 part of flow aid, and 80 parts of the PA66 powder were added into a powder mixing tank, and then sieved with an average particle size of 75 μm, after being subjected to a high-speed stirring process. At a first stage of the high-speed stirring, a temperature of the powder mixing tank was maintained at 80° C., a stirring rate thereof was 1200 r/min, and stirring time thereof was 20 min. At a second stage of the high-speed stirring, the temperature of the powder mixing tank was maintained at 30° C., the stirring rate thereof was 800 r/min, and the stirring time thereof was 150 min. Therefore, a PA66 polymer powder material was obtained.

A fiber laser was used to sinter the prepared PA66 polymer powder material to obtain a sintered workpiece sample. A performance test was performed on the sintered workpiece sample. The results are shown in Table 3.

TABLE 3

Performance parameters of three-dimensional parts prepared by using the polyamide polymer powder materials of the present disclosure

| Examples | Surface coverage rate of the carbon black (%) | Tensile strength (Mpa) | Tensile modulus (MPa) | Tensile elongation at break (%) | Surface roughness (μm) | | | Minimum thickness of wall (mm) |
|---|---|---|---|---|---|---|---|---|
| | | | | | Upper surface | Lower surface | Side surface | |
| Comparative example 3 | 15 | 45 | 1600 | 20 | 11 | 10 | 14 | 0.5 |
| Example 17 | 85 | 48 | 2000 | 100 | 2 | 3 | 3 | 0.15 |
| Example 18 | 100 | 55 | 2200 | 78 | 3 | 3 | 4 | 0.15 |
| Example 19 | 89 | 85 | 5700 | 14 | 2 | 2 | 3 | 0.3 |
| Example 20 | 20 | 105 | 6500 | 10 | 1 | 3 | 2 | 0.3 |

A fiber laser was used to sinter the prepared PA6 polymer powder material to obtain a sintered workpiece sample. A performance test was performed on the sintered workpiece sample. The results are shown in Table 3.

Example 20

(1) 100 parts of Polyamide 66 (PA66) granules, 15 parts of copper powder with a particle size of 25 μm, and 1200 parts of methanol were added into a polymerization kettle. The whole solvent precipitation method was divided into four stages. At a first stage, namely a heating and pressurizing stage, a stirring rate was controlled to 300 r/min, a In the embodiments of the present disclosure, a laser power of the fiber laser is preferably 30 W to 1000 W, the laser spot has a size of 30 μm to 60 μm, and the laser is controlled at a speed of about 10 m/s to 25 m/s to irradiate a cross-sectional area of the three-dimensional part. After the fusion of one layer is completed under the irradiation of the laser, a powder spreader spreads mixed powder of polyamide and carbon fiber on a working plane with a thickness of 0.1 mm to 0.2 mm. The laser continues to irradiate a cross-sectional area of the three-dimensional part on a new powder layer. The above steps are repeated until a three-dimensional part prepared by the polyamide polymer powder material is obtained. It is found that the prepared three-dimensional part has a better performance at the characteristic structure compared to being prepared by using a $CO_2$ laser.

It is worth noting that in this embodiment, the limitations for the parameters of the fiber laser and the thickness of the spreading powder are both preferred, and do not constitute limitations on the parameters of the fiber laser applied to the polyamide polymer powder material prepared by the present disclosure and the thickness of the spreading powder. The conditions of other parameters of the fiber laser and thickness of the spreading powder which are not listed in the embodiments of the present disclosure are also applicable.

Figure 5:
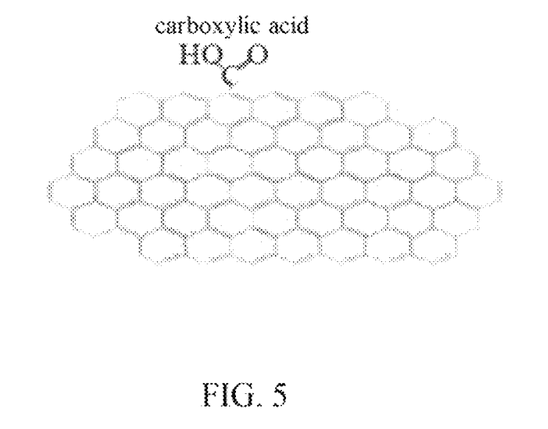
FIG. 5 is a schematic view of a surface functional group of carbon black according to the present disclosure.

Referring to FIG. 5, which is a schematic diagram showing that surface functional group of the carbon black is carboxylic acid, the middle black grid part is a two-position structure in the middle of the carbon black, and other functional groups are not listed one by one. The surface functional group of the carbon black can react with the carbon black during the powder preparation by the solvent method. The carbon black can be combined with molecular chains of the polyamide more tightly, so that the carbon black can further increase the toughness of the material to a certain extent. Moreover, the carbon black is uniformly dispersed in the polyamide powder, so that the carbon black absorbs the laser energy well. The entire powder can be melted. The toughness of the sintered part is better, and the impact resistance thereof is improved.

According to the polyamide polymer powder material prepared by the present disclosure, the carbon black and the polyamide powder are uniformly dispersed, which prevents the carbon black from agglomerating, and further improves the fluidity of the polyamide polymer powder. The coverage rate of the carbon black on a surface of the polyamide powder material is extremely high.

Through the powder preparation process of the present disclosure, the thermal medium can be coated by the polyamide powder, while the carbon black is uniformly coated on the surface of the polyamide powder, referring to FIG. 5 for details. The thermal medium and the carbon black on the surface of the polyamide absorb the energy of the fiber laser efficiently. In this way, a fiber laser with a smaller laser power and spot can also make the polyamide powder absorb enough energy to be melted. Finer polyamide polymer workpieces can be prepared by the selective laser sintering technology. The prepared polyamide polymer workpiece has lower surface roughness, and can be used to prepare smaller-sized characters, smaller-sized hollow structures, smaller-sized cylinders, smaller-sized interconnected structures, and the like.

Through the powder preparation process of the present disclosure, a smaller amount of the thermal medium and the carbon black can be added, so that the polyamide powder can absorb enough energy to be melted. Since the more thermal medium, the easier it is for the sintered polyamide to crystallize, the warpage and shrinkage generated by the sintering are more serious, which seriously affects the dimensional stability of the workpiece. The less the carbon black, the better the performance of the prepared workpiece. The performance of the workpieces formed by sintering the polyamide polymer powder materials prepared by the powder preparation process of the present disclosure is greatly improved.

During the powder preparation process by a solvent method, the thermal medium is added. The thermal medium acts as a nucleating agent, and the molecular chain of the polyamide coats the thermal medium, to grow into the polyamide powder. In this way, not only the carbon black on the surface of the powder can absorb the energy of the fiber laser, but the thermal medium can also absorb the energy of the fiber laser, which can be beneficial to melt the entire polyamide powder. The sintered workpiece can have a better performance. Moreover, the thermal medium can also enhance the performance of the sintered workpiece, which further broadens the material application type and application scope of this technology.

Inner and the outer surfaces of the polyamide polymer powder material prepared by the present disclosure both contain the thermal medium. The thermal medium on the inner surface is used as the nucleating agent. The carbon black is uniformly covered on the outer surface of the polyamide powder material. Therefore, a heat absorption conduction and thermal insulation temperature field in which the inner surface and the outer surface both contain the thermal medium is formed. Referring to FIG. 4 for details, there are three sizes of circles in FIG. 4. The largest circle represents the polyamide powder material, and the smallest circle represents the carbon black. The carbon black is uniformly covered on the outer surface of the polyamide powder material. The circle with a middle size represents the thermal medium. The thermal medium is inside the surface of the polyamide powder material, and is used as the nucleating agent. The thermal medium and the carbon black are located on the inner surface and outer surface of the polyamide powder material, respectively. An inward-pointing arrow represents a schematic directional diagram of the inward thermal conduction of the carbon black, and an outward-pointing arrow represents a schematic directional diagram of the outward thermal conduction of the thermal medium. It is obvious that the thermal medium and the carbon black form the heat absorption conduction and thermal insulation temperature field of the polyamide powder material.

It is worth noting that, in the present disclosure, the parts of all components represent the parts by mass. In the present disclosure, the carbon black is preferably covered on the surface of the polyamide powder, and thus the workpiece has an excellent performance. Obviously, the carbon black can also be graphite, graphene, carbon fiber, ferric oxide powder, ferroferric oxide powder, or metal powder. Such conventional replacements of the thermal medium are also fallen within the protection scope of the present disclosure. The base material used by the present disclosure is preferably polyamide. Alternatively, thermoplastic polyurethane powder material, polypropylene powder material, polyethylene powder material, ethylene-vinyl acetate copolymer powder material, polyethersulfone powder material, polyphenylene sulfide powder material, or polyether ether ketone powder material can also be used. Such conventional replacements of the base material are also fallen within the protection scope of the present disclosure. Embodiments in which the above-mentioned alternative thermal medium materials and base materials are used will not be repeated herein.

Example 21

(1) 20 parts of PA66/PA6 binary copolymerized polyamide powder with an average particle size of 60 μm and 1 part of carbon black with an average particle size of 80 nm were added into a stirring tank for stirring. A temperature of the stirring tank was maintained at 30° C., a stirring rate thereof was 1500 r/min, and stirring time thereof was 1 min. Therefore, a PA66/PA6 binary copolymerized polyamide carbon black mixed powder was prepared.

(2) 20 parts of the PA66/PA6 binary copolymerized polyamide carbon black mixed powder, 1 part of fumed silica, and 80 parts of the PA66/PA6 binary copolymerized polyamide powder were added into a powder mixing tank, and then sieved with an average particle size of 60 μm, after being subjected to a high-speed stirring process. At a first stage of the high-speed stirring, a temperature of the powder mixing tank was maintained at 70° C., a stirring rate thereof was 1500 revolutions/min, and stirring time thereof was 1 min. At a second stage of the high-speed stirring, the temperature of the powder mixing tank was maintained at 40° C., the stirring rate thereof was 600 revolutions/min, and the stirring time thereof was 5 min. Therefore, a PA66/PA6 binary copolymerized polyamide polymer powder material was obtained.

A fiber laser was used to sinter the prepared PA66/PA6 binary copolymerized polyamide polymer powder material to obtain a sintered workpiece sample. A performance test was performed on the sintered workpiece sample. The results are shown in Table 4.

Example 22

(I) 20 parts of Polyamide 1010/Polyamide 1012/Polyamide 6 (PA1010/PA1012/PA6) ternary copolymerized polyamide powder with an average particle size of 75 μm and 5 parts of carbon black with an average particle size of 60 nm were added into a stirring tank for stirring. A temperature of the stirring tank was maintained at 40° C., a stirring rate thereof was 2000 r/min, and stirring time thereof was 0.5 min. Therefore, a PA1010/PA1012/PA6 ternary copolymerized polyamide carbon black mixed powder was obtained.

(2) 20 parts of the PA1010/PA1012/PA6 ternary copolymerized polyamide carbon black mixed powder, 0.5 part of fumed silica, and 80 parts of the PA1010/PA1012/PA6 ternary copolymerized polyamide powder were added into a powder mixing tank, and then sieved with an average particle size of 75 μm, after being subjected to a high-speed stirring process. At a first stage of the high-speed stirring, a temperature of the powder mixing tank was maintained at 75° C., a stirring rate thereof was 1400 revolutions/min, and stirring time thereof was 1.5 min. At a second stage of the high-speed stirring, the temperature of the powder mixing tank was maintained at 35° C., the stirring rate thereof was 700 revolutions/min, and the stirring time thereof was 4 min. Therefore, a PA1010/PA1012/PA6 ternary copolymerized polyamide polymer powder material was obtained.

A fiber laser was used to sinter the prepared PA1010/PA1012/PA6 ternary copolymerized polyamide polymer powder material to obtain a sintered workpiece sample. A performance test was performed on the sintered workpiece sample. The results are shown in Table 4.

Example 23

(1) 20 parts of epoxy resin powder with an average particle size of 40 μm and 0.1 part of carbon black with an average particle size of 200 nm were added into a stirring tank for stirring. A temperature of the stirring tank was maintained at 30° C., a stirring rate thereof was 2000 r/min, and stirring time thereof was 5 min. Therefore, an epoxy resin carbon black mixed powder was obtained.

(2) 20 parts of the epoxy resin carbon black mixed powder, 1 part of fumed alumina, and 80 parts of the epoxy resin powder were added into a powder mixing tank, and then sieved with an average particle size of 40 μm, after being subjected to a high-speed stirring process. At a first stage of the high-speed stirring, a temperature of the powder mixing tank was maintained at 80° C., a stirring rate thereof was 1200 revolutions/min, and stirring time thereof was 20 min. At a second stage of the high-speed stirring, the temperature of the powder mixing tank was maintained at 30° C., the stirring rate thereof was 800 r/min, and the stirring time thereof was 150 min. Therefore, an epoxy resin polymer powder material was obtained.

A fiber laser was used to sinter the prepared epoxy resin polymer powder material to obtain a sintered workpiece sample. A performance test was performed on the sintered workpiece sample. The results are shown in Table 4.

Example 24

(1) 20 parts of polyimide powder with an average particle size of 45 μm and 5 parts of carbon black with an average particle size of 300 nm were added into a stirring tank for stirring. A temperature of the stirring tank was maintained at 35° C., a stirring rate thereof was 1600 r/min, and stirring time thereof was 2 min. Therefore, a polyimide carbon black mixed powder was obtained.

(2) 20 parts of the polyimide carbon black mixed powder, 0.2 part of fumed silica, and 80 parts of the polyimide powder were added into a powder mixing tank, and then sieved with an average particle size of 45 μm, after being subjected to a high-speed stirring process. At a first stage of the high-speed stirring, a temperature of the powder mixing tank was maintained at 70° C., a stirring rate thereof was 1300 revolutions/min, and stirring time thereof was 5 min. At a second stage of the high-speed stirring, the temperature of the powder mixing tank was maintained at 35° C., the stirring rate thereof was 760 revolutions/min, and the stirring time thereof was 15 min. Therefore, a polyimide polymer powder material was obtained.

A fiber laser was used to sinter the prepared polyimide polymer powder material to obtain a sintered workpiece sample. A performance test was performed on the sintered workpiece sample. The results are shown in Table 4.

TABLE 4

Performance parameters of three-dimensional parts prepared by using the macromolecule polymer powder materials of the present disclosure

| Examples | Surface coverage rate of the carbon black (%) | Tensile strength (Mpa) | Tensile elongation at break (%) | Surface roughness (μm) | | | Minimum thickness of wall (mm) |
|---|---|---|---|---|---|---|---|
| | | | | Upper surface | Lower surface | Side surface | |
| Example 21 | 97 | 50 | 220 | 5 | 5 | 6 | 0.1 |
| Example 22 | 190 | 45 | 540 | 4 | 5 | 7 | 0.1 |

TABLE 4-continued

Performance parameters of three-dimensional parts prepared by using the macromolecule polymer powder materials of the present disclosure

| Examples | Surface coverage rate of the carbon black (%) | Tensile strength (Mpa) | Tensile elongation at break (%) | Surface roughness (μm) | | | Minimum thickness of wall (mm) |
|---|---|---|---|---|---|---|---|
| | | | | Upper surface | Lower surface | Side surface | |
| Example 23 | 120 | 35 | 3 | 6 | 4 | 10 | 0.2 |
| Example 24 | 220 | 86 | 2 | 4 | 3 | 5 | 0.15 |

Through the stirring process of the present disclosure, the carbon black and the macromolecule polymer powder are uniformly dispersed, which prevents the carbon black from agglomerating, and further improves the fluidity of the macromolecule polymer powder. The coverage rate of the carbon black on a surface of the macromolecule powder material is extremely high, which is beneficial for the carbon black to absorb heat and transfer the heat to the surface of the macromolecule polymer powder, so that the macromolecule polymer powder can be melted more fully.

The carbon black is uniformly coated on a surface of the polyamide powder, and the carbon black absorbs the energy of the fiber laser efficiently. In this way, a fiber laser with a smaller laser power and spot can also make the macromolecule polymer powder absorb enough energy to be melted. Finer macromolecule polymer workpieces can be prepared by selective laser sintering technology. The prepared macromolecule polymer workpiece has lower surface roughness, and can be used to prepare smaller-sized characters, smaller-sized hollow structures, smaller-sized cylinders, smaller-sized interconnected structures, and the like.

By adding a smaller amount of carbon black, the macromolecule polymer powder can absorb enough energy to be melted. In the macromolecule polymer powder materials, the more the content of the carbon black, the easier it is for the sintered macromolecule polymer powder material to crystallize, which makes the warpage and shrinkage of the sintered workpiece more serious, seriously affecting the dimensional stability of the workpiece. The less the content of the carbon black, the better the performance of the prepared workpiece. The performance of the workpieces formed by sintering the macromolecule polymer powder materials prepared by the stirring process in the present disclosure, is greatly improved.

By adding the carbon black, the macromolecule polymer powder, that cannot absorb the energy of the laser or has poor absorption effect on the energy of the laser in the prior art, can be turned into the macromolecule polymer powder that can easily absorb the energy of the laser. The fiber laser can be used well for sintering to prepare the workpiece. Therefore, the material application type and application scope of this technology is broadened.

An outer surface of the macromolecule polymer powder material prepared by the present disclosure is uniformly covered with the carbon black. Referring to FIG. 2 for details, there are two sizes of circles in FIG. 2. The largest circle represents the macromolecule powder material, and the smallest circle represents the carbon black. The carbon black is uniformly covered on the outer surface of the macromolecule powder material. An inward-pointing arrow represents a schematic directional diagram of the thermal conduction from the carbon black to the macromolecule powder material. It is obvious that the carbon black is uniformly covered on the outer surface of the macromolecule powder material, which forms a thermal conduction and thermal insulation temperature field. The carbon black absorbs the energy of the fiber laser efficiently, such that the macromolecule powder material is easier to absorb the laser energy.

In the embodiments of the present disclosure, the macromolecule polymer powder material is a thermosetting resin powder material. The thermosetting resin powder is phenolic resin powder, urea resin powder, melamine-formaldehyde resin powder, epoxy resin powder, unsaturated resin powder, polyurethane powder, or polyimide powder, which further broadens the application types of materials.

In the embodiments of the present disclosure, the macromolecule polymer powder material is a binary or ternary copolymerized polyamide powder. The polyamide powder material is copolymerized by two or three salts selected from the group consisting of caprolactam, ω-aminoundecanoic acid, laurolactam, PA6 salt, PA66 salt, Polyamide 610 (PA610) salt, Polyamide 612 (PA612) salt, PA1010 salt, PA1012 salt, and PA1212 salt. The copolymerized polyamide has low crystallinity, better sintering copolymer toughness, and lower enthalpy value. The polyamide powder material is more suitable for being sintered by the fiber laser.

In the embodiments of the present disclosure, a laser power of the fiber laser is preferably 30 W to 1000 W, the laser spot thereof has a size of 30 μm to 1500 μm, and the laser thereof is controlled at a speed of about 10~30 m/s to irradiate a cross-sectional area of the three-dimensional part. After the fusion of one layer is completed under the irradiation of the laser, a powder spreader spreads mixed powder of polyamide and carbon fiber on a working plane with a thickness of 0.1 mm to 0.2 mm. The laser continues to irradiate a cross-sectional area of the three-dimensional part on a new powder layer. The above steps are repeated until a three-dimensional part prepared by the macromolecular polymer powder material is obtained. It is found that the prepared three-dimensional part has a better performance at the characteristic structure compared to being prepared by using a $CO_2$ laser.

It is worth noting that in this embodiment, the limitations for the parameters of the fiber laser and the thickness of the spreading powder are both preferred, and do not constitute limitations on the parameters of the fiber laser applied to the macromolecule polymer powder material prepared by the present disclosure and the thickness of the spread powder. The conditions of other parameters of the fiber laser and thickness of the spreading powder which are not listed in the embodiments of the present disclosure are also applicable.

In the present disclosure, the parts of all components represent the parts by mass. In the present disclosure, the carbon black is preferred used as the thermal medium for thermal conduction of the macromolecule powder materials.

The performance of the workpieces is excellent. Obviously, the thermal medium for thermal conduction of the macromolecule powder materials can also be graphite, graphene, carbon fiber, ferric oxide powder, ferroferric oxide powder, or metal powder. The conventional replacements of the thermal medium for thermal conduction of the macromolecule powder materials are also fallen within the protection scope of the present disclosure. Embodiments in which the above-mentioned alternative thermal medium materials are used are not repeated herein.

What is claimed is:

1. A method of preparing a macromolecule polymer powder material, comprising:
adding 20 parts of macromolecule powder material and 0.1~10 parts of carbon black into a stirring tank for a first high-speed stirring to obtain a macromolecule carbon black mixed powder material, wherein the macromolecule powder material is chosen from thermoplastic polyurethane powder material, ethylene-vinyl acetate copolymer powder material, polyethersulfone powder material, polyphenylene sulfide powder material, or polyether ether ketone powder material, and wherein the first high-speed stirring comprises:
a temperature of the stirring tank is maintained at 30~40° C.;
a stirring rate of the stirring tank is 1500~2000 r/min; and
a stirring time of the stirring tank is 0.5~5 min; and
adding the macromolecule carbon black mixed powder material, 0.1~1 part of flow aid, and 80 parts of the macromolecule powder material into a powder mixing tank for a second high-speed stirring, and then sieving, to obtain the macromolecule polymer powder material having an average particle size of 40~75 μm, wherein the flow aid is chosen from fumed silica, fumed alumina, or nano titanium dioxide, wherein the second high-speed stirring comprises a first stage and a second stage, wherein the first stage comprises:
a temperature of the powder mixing tank is maintained at 70~80° C.;
a stirring rate of the powder mixing tank is 1200~1500 r/min; and
a stirring time of the powder mixing tank is 1~20 min; and
wherein the second stage comprises:
the temperature of the powder mixing tank is maintained at 30~40° C.;
the stirring rate of the powder mixing tank is 600~800 r/min; and
the stirring time of the powder mixing tank is 3~150 min.

2. The method of preparing the macromolecule polymer powder material according to claim 1, wherein the carbon black has an average particle size of 60~1000 nm.

3. The method of preparing the macromolecule polymer powder material according to claim 2, wherein the carbon black has an average particle size of 60~100 nm.

4. The method of preparing the macromolecule polymer powder material according to claim 2, wherein a coverage rate of the carbon black on a surface of the macromolecule polymer powder material after sieving is 20%~500%.

* * * * *